United States Patent [19]

Bickford

[11] 4,292,835

[45] Oct. 6, 1981

[54] CALIBRATION APPARATUS AND METHOD FOR STRAIN MEASURING INSTRUMENTS

[75] Inventor: John H. Bickford, Middletown, Conn.

[73] Assignee: Raymond Engineering, Inc., Middletown, Conn.

[21] Appl. No.: 124,300

[22] Filed: Feb. 25, 1980

[51] Int. Cl.$^3$ ............................................. G01L 25/00
[52] U.S. Cl. ........................................ 73/1 B; 73/761
[58] Field of Search ................... 73/1 B, 761, 141 R, 73/789

[56] References Cited

U.S. PATENT DOCUMENTS

| | | | |
|---|---|---|---|
| 3,194,050 | 7/1965 | Ruge | 73/1 B |
| 3,248,923 | 5/1966 | Blakeley | 73/1 B |
| 3,759,090 | 9/1973 | McFaul et al. | 73/761 X |

*Primary Examiner*—Jerry W. Myracle
*Attorney, Agent, or Firm*—Fishman and Van Kirk

[57] ABSTRACT

A calibration apparatus and method is presented for calibrating an ultrasonic extensometer which is used to determine the average level of stress in a bolt or stud. The calibration apparatus uses linear displacement transducers and force measuring apparatus to accurately determine the stress-strain relationship of a bolt or stud. Simultaneously, readings on an ultrasonic extensometer strain measuring apparatus are monitored, and the ultrasonic extensometer is calibrated in accordance with the linear transducer and force measuring readings.

17 Claims, 7 Drawing Figures

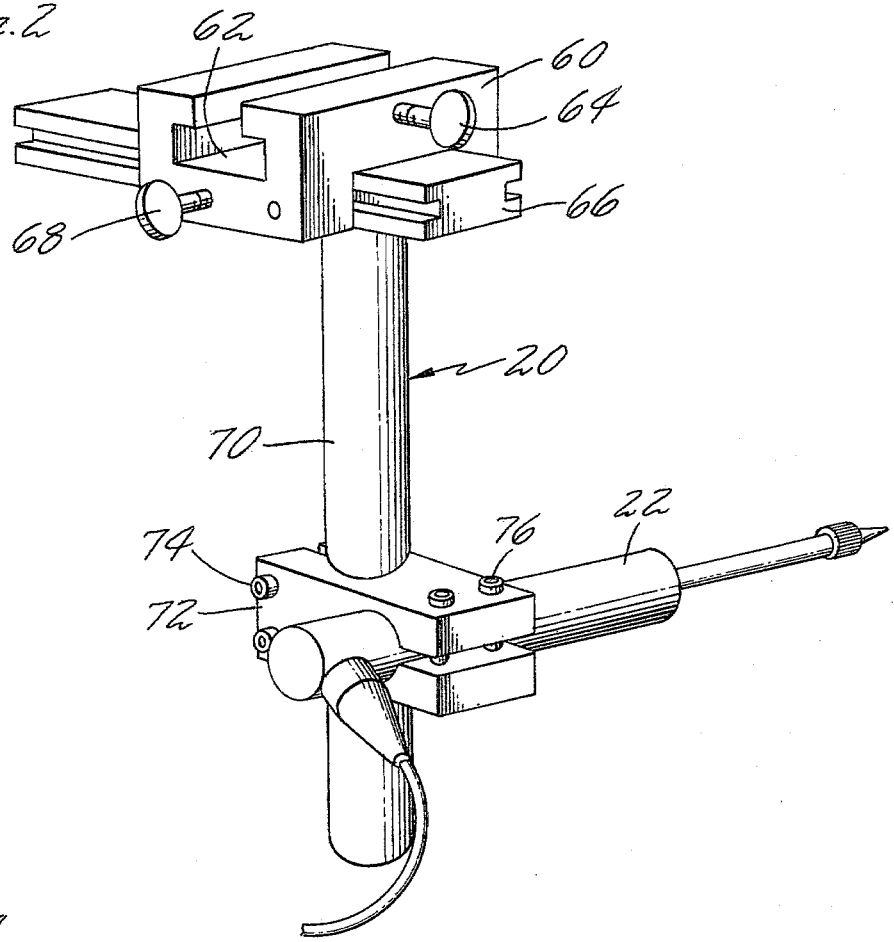

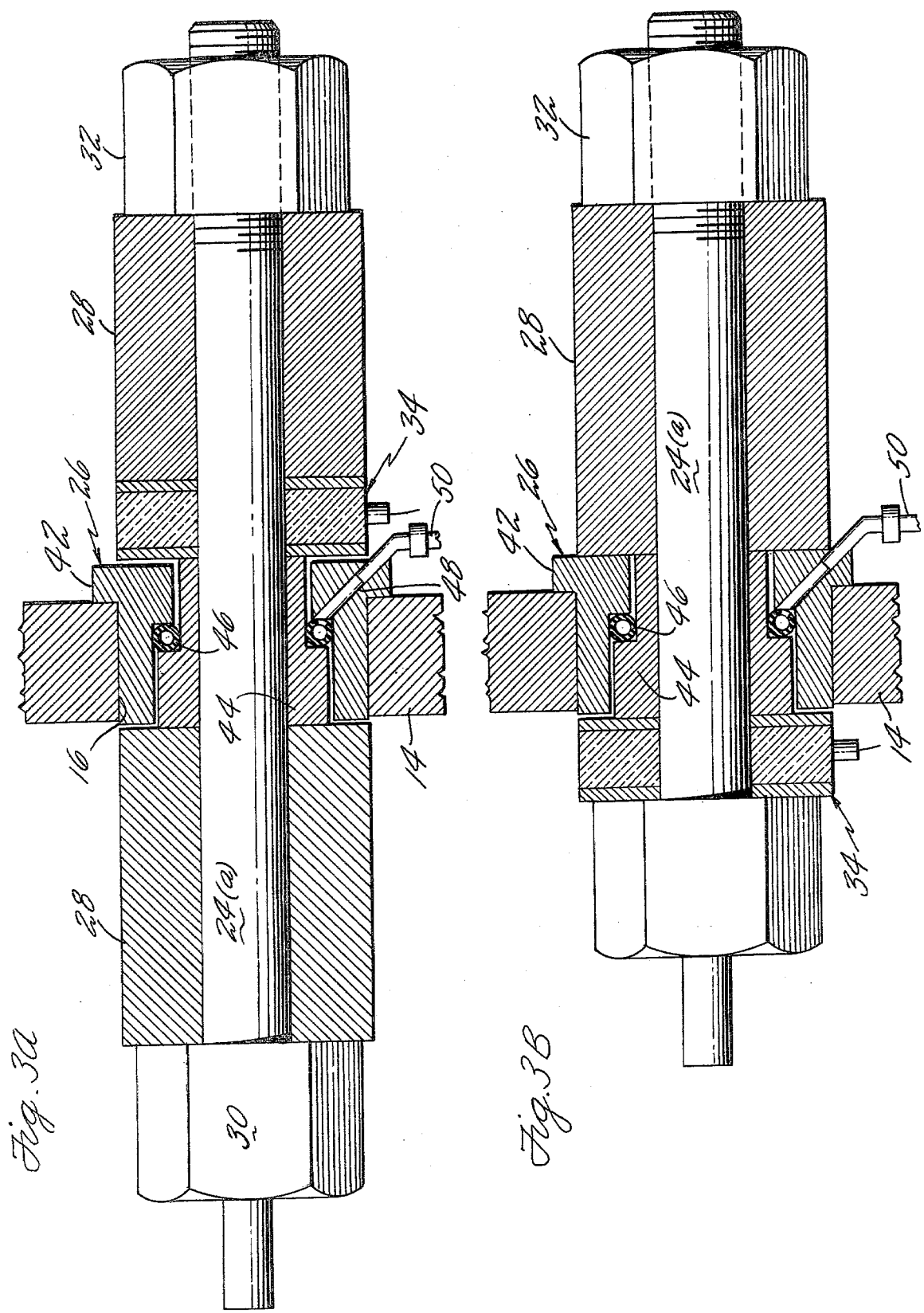

CALIBRATION APPARATUS AND METHOD FOR STRAIN MEASURING INSTRUMENTS

BACKGROUND OF THE INVENTION

This invention relates to the field of force measuring apparatus and methods for determining the average stress in bolts or studs under tension. More particularly, this invention relates to a calibration stand and method for accurately calibrating an ultrasonic extensometer so that the readings obtained from the ultrasonic extensometer during normal use thereof can be relied upon as being accurate.

Ultrasonic extensometers are known in the art. The particularly preferred ultrasonic extensometer is shown and described in U.S. Pat. No. 3,759,090, which is incorporated herein by reference for all of its disclosure. Ultrasonic extensometers function by measuring the time difference required for ultrasonic signals to travel from one end of a bolt or stud to the other end and be reflected back. As a bolt or stud is stressed to tighten a joint, the bolt is elongated. That elongation of the bolt results in change in the time required for an ultrasonic signal to traverse the length of the bolt. Thus, by accurately monitoring the time required for passage of ultrasonic signals along the length of a bolt or stud, the tension load imposed on the bolt or stud can be determined from Hooke's law of linear relationship between stress and strain.

In order to be confident of the accuracy of readings from an ultrasonic extensometer, it is highly desirable to calibrate each extensometer before it is put into actual use, and it may be desirable to periodically recalibrate the extensometer to insure its continual accurate operation. To calibrate an extensometer, it becomes necessary to impose a tensile load on a bolt or stud, accurately determine both the level of the load and the change in length of the bolt or stud (the reference data) by accurate measuring apparatus other than an extensometer, simultaneously monitor the changes in length of the bolt or stud with an extensometer, compare the readings of the extensometer with the known reference values of force and strain, and adjust the output of the extensometer so that its output agrees with the reference data.

Accordingly, one object of the present invention is to provide novel and improved apparatus and methods for calibrating an extensometer.

Still another object of the present invention is to provide novel and improved apparatus and methods for obtaining reference data of force and strain while simultaneously monitoring the change in length of a bolt or stud under stress with an ultrasonic extensometer, and thereafter calibrating the ultrasonic extensometer to agree with the reference data.

Another object of the present invention is to provide novel and improved apparatus and methods for field testing of a bolt whereby both ends of the bolt are accessible for transducer and probe monitoring at all times when the bolt is under stress.

Other objects and advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES:

FIG. 2 is a detail of the mounting apparatus for linear displacement probes used in the apparatus of FIG. 1;

FIG. 3a is a detailed view of load cell apparatus used in the present invention;

FIG. 3B is a modified version of the apparatus of FIG. 3a showing a preferred configuration;

FIG. 4 is a general representation of a force-elongation curve showing a linear relationship predicted by Hooke's law;

DESCRIPTION OF THE PREFERRED EMBODIMENT

Figure 1:
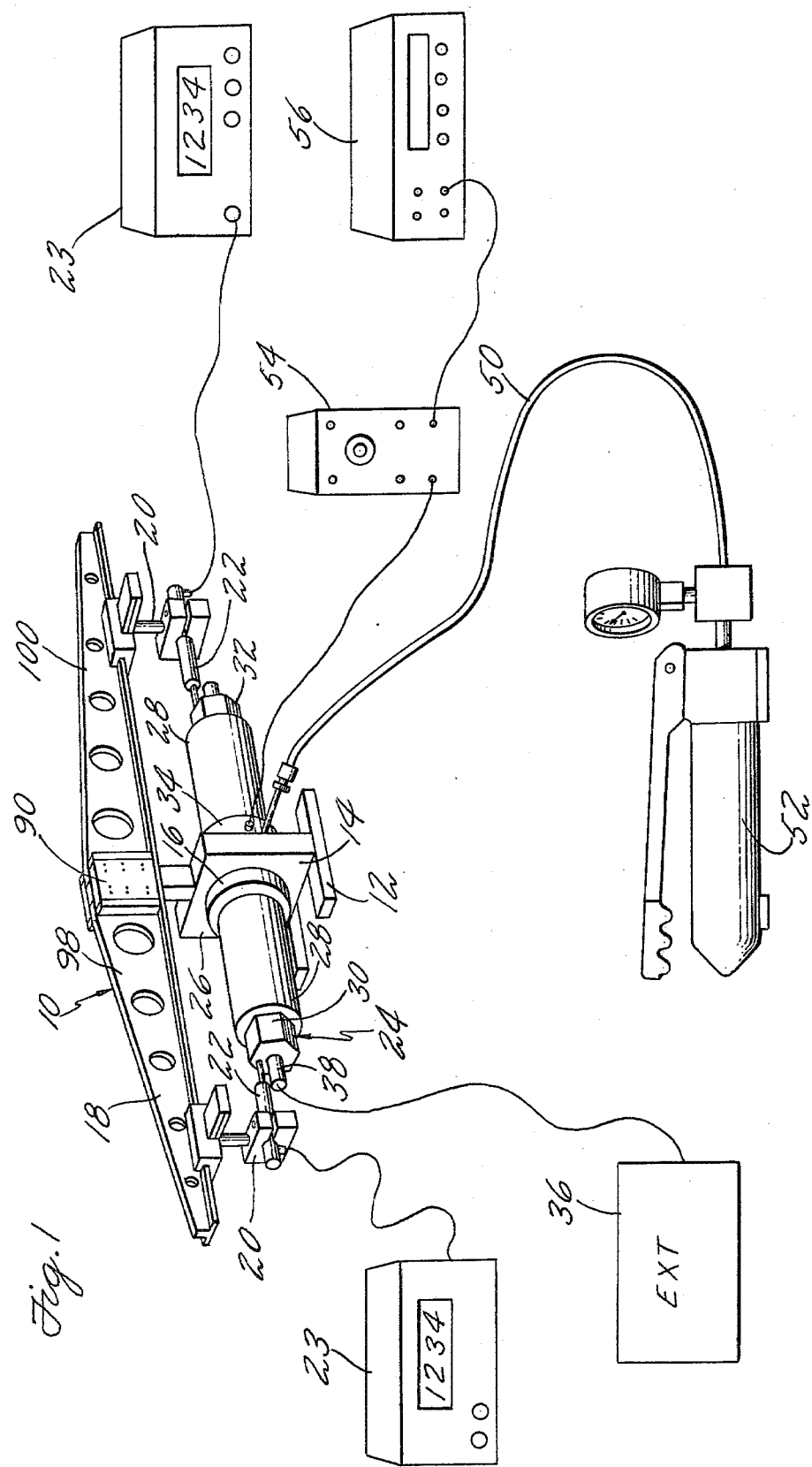
FIG. 1 is a schematic representation of a horizontal calibration stand for calibrating an ultrasonic extensometer in accordance with the present invention.

Referring first to FIG. 1, a horizontal version of the calibration stand 10 is shown for purposes of general explanation and information. The test stand has a base 12 which will stand on a test bench, floor or other supporting structure. Base 12 includes a mounting strut 14 which has a central aperture 16 for the mounting of test apparatus (as will be more fully described). A T-bar suspension girder 18 extends from the top of strut 14 to form, in effect, mounting arms for test apparatus. A pair of adjustable probe mounts 20 are slideably mounted on opposite ends of suspension girder 18. These probe mounts 20 each carry a linear measuring probe 22 for measuring the change in length of the bolt to be tested in the calibration stand. The probe mounts 20 are adjustable in the X direction (i.e., along the length of girder 18 and along the axis of a bolt to be mounted in the calibration stand) and in the Y direction (i.e., perpendicular to the length of girder 18 and perpendicular to the axis of a bolt or stud to be mounted in the stand). Thus, bolts of different lengths may be monitored, and different points on the end surfaces of the bolts may be monitored.

The linear probes 22 may be any very accurate linear probes which are effective to sense changes in the linear dimension of an article and provide a readout of the length or change in length. In the presently preferred configuration of the present invention, the probes are SONY linear measuring probes which are commercially available and identified as SONY probe Model DG2025SA and the probes are connected to SONY digital readout units 23 commercially available and known as SONY Magnescale LY-201. These SONY probes and readouts provide linear measurements to an accuracy of 0.00001 inch.

Still referring to the general showing in FIG. 1 a bolt or stud, indicated generally at 24, which is to be subjected to force and strain measurements is mounted in the calibration stand and passes through central aperture 16 to extend between the two linear probes 22. As will be explained in more detail hereinafter, bolt 24 is encased in both a force cell 26 mounted in aperture 16 and a pair of spacers 28, one of which extends from the load cell 26 to bolt head 30 and the other of which extends to a nut 32 at the other end of the bolt. A load measuring cell 34 also surrounds the bolt 24 between the force cell 26 and one of the spacers 28. In the operation of the device, which will be more fully described hereinafter, the load cell imposes a load on one or both of the spacers 28 to load the bolt in tension. The linear probes 22 sense the axial change in length of the bolt, and the load cell 34 senses the load which is causing the elongation. This load and elongation data (i.e., the force and strain) are used as reference data to calibrate an ultrasonic extensometer 36, the ultrasonic probe 38 of which is ultrasonically coupled to one end of the bolt to measure bolt elongation ultrasonically simultaneously with the measurements obtained by the linear probes 22. The ultrasonic extensometer 36 is gauged to provide output readings of elongation, which can be directly correlated to stress. Thus, the gauge of the extensometer may be calibrated to provide an accurate reading as determined by comparison with the force and strain data obtained from the linear probes 22 and the load measuring cell 34.

Referring to FIG. 3a, details are shown of the mounting of the bolts in the calibration stand. The shank 24(a) of bolt 24 extends through the center of aperture 16 of mounting strut 14, with the head 30 of the bolt on one side of strut 14 and the nut 32 on the other side. The bolt shank 24(a) also passes through a central opening in force cell 26. Force cell 26 is a Pilgrim type B load cell which is a standard commercial item available from Sealol Inc. of Providence, R.I. Although it is not necessary to describe all of the details of load cell 26, the load cell can generally be described as having an annular housing 42, a movable annular piston 44 and an O-ring bladder 46 between the housing and the piston. Bladder 46 is connected via passage 48 and hose 50 to a hydraulic pump 52 (see FIG. 1) whereby the bladder can be pressurized to impose a load between piston 44 and housing 42 urging those elements apart. The load may be large, such as on the order of 80,000 lbs.; or more or less as desired. It will be noted that there is a slip fit between shank 24(a) and the central passage of the load cell 26 so that the elements of the load cells are free to move relative to the bolt.

Piston 44 butts against the right end of the left spacer 28, and the left end of spacer 28 butts against the right end of head 30. Thus, forces loading piston 44 to the left will be transmitted through left spacer 28 to the head of the bolt. On the right side of the load cell, housing 42 butts against the left side of an annular load measuring cell 34, and the right side of load measuring cell 34 butts against the left end of the right spacer 28. The right end of right spacer 28, in turn, butts against the left end of nut 32 to complete a snug assembly. Load measuring cell 34 may be any conventional load measuring unit which is capable of accurately measuring the force, i.e., the load, generated in load cell 26. Indeed, rather than a load cell per se, the force or load measurements could be obtained by a plurality of strain gauges on one of the spacers 28, in which event the separate load measuring cell 34 would be omitted and the right spacer 28 would extend to butt against housing 42. However, in the preferred configuration of this invention, the load measuring cell 34 is a Kristal series 9000 quartz force transducer which is commercially available from Kristal Instrument Corporation in Grand Island, N.Y. This Kristal load measuring cell has quartz elements sandwiched between outer metal rings, and the cell operates on piezoelectric effects to generate electrical signals proportional to force loading. The electrical signals from cell 34 are transmitted to a Kristal 5002 charge amplifier 54 (also commercially available from Kristal Instrument Corporation), and the amplified signals are delivered to and displayed on a digital readout meter 56 in terms of pounds of force (see FIG. 1).

In the operation of the device shown in FIGS. 1 and 3a, hydraulic pump 52 is operated to deliver pressurized hydraulic fluid to load cell 26 which, in turn, imposes a tension load on bolt 24 through the assembly of load cell, spacers and the load measuring cell. The tensioning force actually applied to the bolt is accurately measured by load measuring cell 34 and displayed on meter 56. The elongation of the bolt caused by the load at any time is accurately sensed by probes 22 and displayed on readouts 23, with the algebraic sum of the readings being the total elongation. Thus, as the tension load is imposed and/or varied on the bolt, accurate data of force and strain are obtained which can be used to plot a force-elongation curve or line, as shown in FIG. 4. Simultaneously with the generation of the force and strain data, readings are also obtained from extensometer 36 which is coupled to bolt 24 through ultrasonic transducer 38 to measure the elongation of the bolt. Ultrasonic extensometer 36 may be calibrated to provide a readout in terms of either bolt elongation or the tension load which has produced the elongation. In either event, the object of the invention is to calibrate the readout of extensometer 36 by making appropriate adjustments to the extensometer so that the extensometer readout corresponds with the reference data of stress and strain generated by load cell 34 and linear displacement probes 22.

Referring now to FIG. 3B, a preferred configuration is shown as an alternative to the arrangement of FIG. 3a. In the FIG. 3B configuration, one of the spacers 28 is eliminated, and the load cell 34 is sandwiched directly between bolt head 30 and piston 44. At the other end of the bolt, one of the spacers 28 extends between bolt cell housing 42 and nut 32. Of course, the arrangement of parts could be reversed if desired. The arrangement shown in FIG. 3B is preferred because it has been determined that the Pilgrim load cell 26 tends to push primarily, if not exclusively, in one direction (i.e., the direction of movement of the piston) rather than causing equal and opposite movements of the housing and piston when the bladder 46 is loaded. Since a fastener which is being pushed is more likely to be bent than one which is being pulled, it is best to mount the Pilgrim load cell 26 close to the pushed end of the bolt. Accordingly, the arrangement of FIG. 3B is preferred.

Regardless of whether the arrangement of FIG. 3a or 3B is to be used, it should be noted that the readouts of the two linear displacement probes 22 must be subtracted from each other to determine the elongation of the bolt. This is so because the apparatus configuration of FIGS. 3a and 3B result in a relatively large leftward movement of the bolt at the left end and also a relatively small net leftward displacement of the right end of the bolt; thus, the two leftward displacements must be subtracted from each other to determine the actual elongation of the bolt. This subtraction can be accomplished by actually subtracting the data of one readout 23 from the other, or a readout unit can be used which automatically displays the difference between the two measurements.

Figure 5:
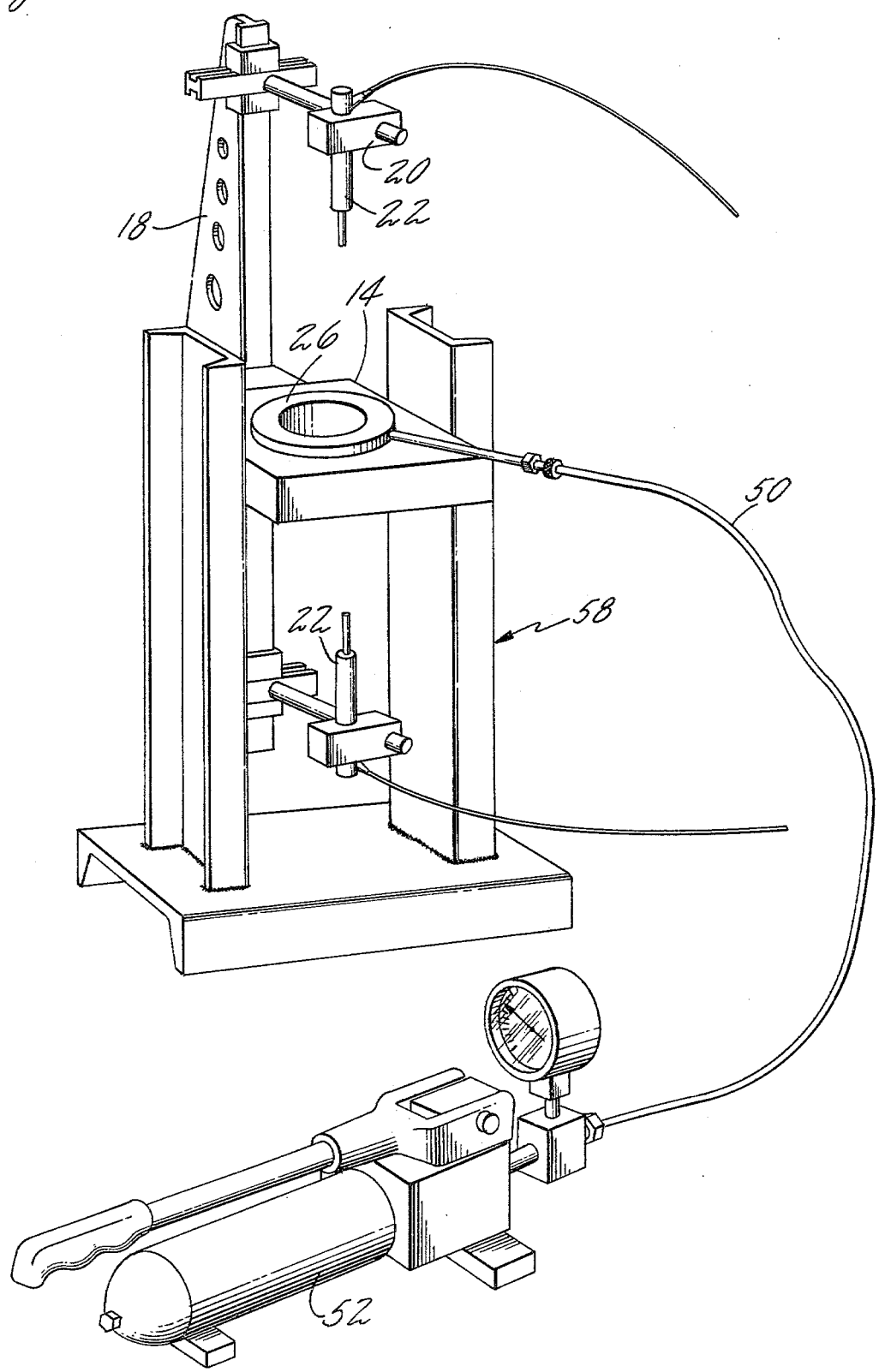
FIG. 5 is a showing of a vertically oriented calibration stand for the present invention, the vertically oriented calibration stand being the preferred configuration for practice of the present invention.

Referring now to FIG. 5, a preferred configuration for the calibration test stand is disclosed wherein the test stand is vertically oriented. The apparatus shown in FIG. 5 is essentially the same as the apparatus shown and described with respect to FIG. 1, and similar elements are numbered as in FIG. 1. The additional apparatus shown in FIG. 5 is a mounting frame 58 to which mounting strut 14 is rigidly attached to effect the vertical orientation of the calibration stand. The bolt, collars and load cell have been omitted from FIG. 5 for purposes of clarity in illustrating the arrangement, but it will be understood that the bolt, spacers and load cells will be located in mounting strut 14 and extend between the probes 22 in the same manner as described in the FIG. 1 structure. The principal reasons for preferring the vertical orientation of the calibration stand is to minimize misalignment problems and cantilevered loads that may result from gravity effects. In order to insure even force distribution through the spacers, the spacers are sized so that the diameters of the central passageway in the spacers and the load cells are just slightly greater than the diameter of the bolts (on the order of 0.005 to 0.010 inch difference). Also, all butting end surfaces are carefully made square. However, in the horizontal configuration of FIG. 1, any looseness or misalignment is accentuated by gravity forces which distribute all of the misalignment and diameter differences to the bottom of the structure, thus accentuating any misalignment or size differences. By way of contrast, the effect of misalignment or size differences are minimized by the vertical configuration of FIG. 5, since gravity forces will not drag the spacers and load cells off center.

Referring now to FIG. 2, details are shown whereby the probes 22 may be adjusted in the X, Y and Z directions. Each probe mount 20 has a first adjustable slide 60 with a groove 62 to mate with the cross sectional shape of the lower portion of suspension girder 18. This slide 60 may be positioned along the length of the girder to set the X position with the probe by tightening or loosening a thumb screw 64. A second adjustable slide 66 is mounted in a mating slot in the body of slide 60 and is adjustable in the Y direction (or perpendicular to the direction of adjustment of slide 60) by tightening or loosening a thumb screw 68. Mounting shaft 70 is attached to slide 66, and an adjustable clamp 72 is mounted on shaft 70. Adjustable clamp 72 can be moved up and down shaft 70 by tightening or loosening clamping screws 74, and clamp 72 also adjustably retains probe 22, the position of which can also be adjusted by tightening or loosening screws 76. Thus, it will be apparent that the position of probe 22 can be adjusted in either the X, Y or Z direction to bear against any desired location on the end of the bolt head or the end of the bolt against which the probe bears. This adjustability enables the user of the calibration stand to measure the elongation of the bolt not only on the axis but at several clock positions around the bolt. In this way, irregular stretch of the bolt (as a result of bending of the bolt or nonperpendicularity of the parts) can also be determined.

Figure 6:
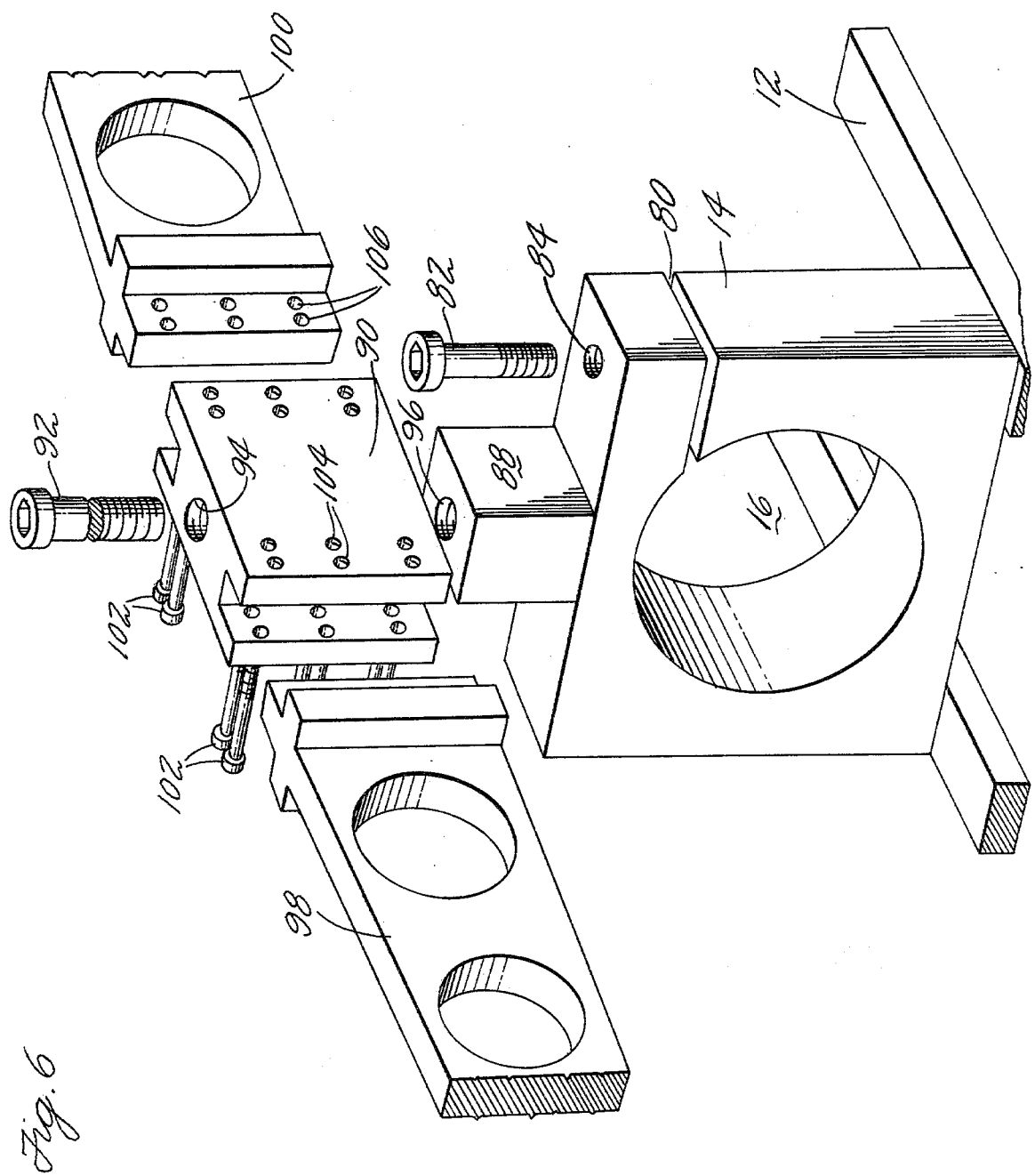
FIG. 6 shows details of the modular construction of the calibration stand.

It should be noted that the entire test stand can be made of modular components which can be broken down for carrying into the field and easily assembled for use on site. Thus, the unit is a portable tensile testing machine which is capable of exerting very high loads. FIG. 6 shows details of the modular construction. Base 12 and mounting strut 14 are welded or otherwise secured together. Strut 14 has a split or gap 80 extending from one side into aperture 16. A locking screw 82 fits into a socket 84 and engages a threaded hole 86 to urge the split parts together to exert a firm grip on the housing 42 of force cell 26 in aperture 16. A post 88 projects above strut 14 and receives a mounting bracket 90 which is releasable secured to post 88 by a threaded fastener 92 which fits in a socket 94 and engages a threaded hole 96 in post 88. Arms 98 and 100 are releasably attached to bracket 90 by dowel pins 102 (only 2 of which are shown for purposes of illustration) which engage aligned holes 104 and 106 in bracket 90 and arms 98 and 100. The unit may be disassembled into the four components of (1) base and strut (12 and 14), (2) bracket (90) and (3,4) arms (98 and 100). The components of the stand may be stored and carried to the site of use in a suitable carrying case, along with the probe mounts 20 and the other components shown in FIG. 1.

It should also be noted that both ends of the bolt under test are always accessible for probe mountings or other measurements during test. This is not possible with conventional tensile test equipment.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. Apparatus for calibrating a strain measuring instrument, the calibrating apparatus including:

test stand means;

first and second probe means mounted in spaced apart relationship on said test stand means, said probe means being capable of sensing elongation of a test specimen;

mounting means in said test stand for mounting a test specimen between said first and second probe means;

load cell means mounted in said test stand for imposing a tension load on a test specimen;

load measuring cell means mounted in said test stand for sensing the load imposed on a test specimen by said load cell means; and coupling means for coupling to a test specimen a strain measuring instrument to be calibrated.

2. Calibration apparatus as in claim 1 including:

measuring means connected to each of said probe means for measuring elongation of a test specimen as sensed by said probe means;

means for delivering a force to said load cell means for imposing the tension load on the specimen; and measuring means connected to said load sensing cell means for measuring the load imposed on a test specimen.

3. Calibration apparatus as in claim 2 including:

adjustable support means for mounting each of said probe means on said test stand so as to be adjustable in three mutually perpendicular directions.

4. Calibration apparatus as in claim 3 wherein said test stand means includes:

elongated mounting arm means extending from said mounting means, said arm means extending in a generally horizontal direction to define the direction of orientation of the test stand; and said adjustable support means for said probe means being connected to said mounting arm means.

5. Calibration apparatus as in claim 4 wherein:

said mounting arm means are a pair of arms releasably connected to said mounting means, whereby said test stand can be disassembled into modular components.

6. Calibration apparatus as in claim 3 wherein said test stand means includes:

elongated mounting arm means extending from said mounting means, said arm means extending in a generally vertical direction to define the direction of orientation of the test stand; and said adjustable support means for said probe means being connected to said mounting arm means.

7. Calibration apparatus as in claim 6 wherein:

said mounting arm means are a pair of arms releasably connected to said mounting means, whereby said test stand can be disassembled into modular components.

8. Apparatus as in claim 1 wherein:

the strain measuring instrument is an ultrasonic extensometer.

9. Apparatus for calibrating a strain measuring instrument, the calibration apparatus including:

base means;

a mounting strut attached to said base means, said mounting strut having a central aperture;

first and second mounting arms releasably connected to said mounting strut and extending in opposite directions relative to said strut;

first and second probe means mounted in spaced apart relationship on respective of said first and second arms, said probe means being capable of sensing elongation of a test specimen;

load cell means located in said central aperture of said mounting strut, said load cell means having a central aperture to receive a test specimen;

load measuring cell means supported adjacent to said load cell means and positioned to sense the load imposed on a test specimen by said load cell means;

load transmitting means for transmitting a load from said load cell means to a test specimen; and coupling means for coupling to a test specimen a strain measuring instrument to be calibrated.

10. Calibration apparatus as in claim 9 wherein:

said mounting strut has a split extending from said central aperture to an edge of the mounting strut, and said mounting strut includes force generating means to urge the split parts of said strut into firm engagement with the load cell means in the central aperture of the strut.

11. Calibration apparatus as in claim 9 further including:

measuring means connected to each of said probe means for measuring elongation of a test specimen as sensed by said probe means;

means for causing said load cell means to impose a tension load on the specimen; and measuring means connected to said load measuring cell means for measuring the load imposed on a test specimen.

12. Calibration apparatus as in claim 9 including:

adjustable support means for mounting each of said probe means on said respective arms so as to be adjustable in three mutually perpendicular directions.

13. Calibration apparatus as in claim 9 wherein:

said first and second mounting arms extend in a generally horizontal direction to define the direction of orientation of the calibration apparatus.

14. Calibration apparatus as in claim 9 wherein:

said first and second mounting arms extend in a generally vertical direction to define the direction of orientation of the calibration apparatus.

15. Apparatus as in claim 9 wherein:

the strain measuring instrument is an ultrasonic extensometer.

16. The method of calibrating a strain measuring instrument, including the steps of:

positioning a test specimen in a test stand;

contacting opposite ends of the test specimen with linear probes;

coupling to the test specimen an instrument to be calibrated;

imposing a tension load on the test specimen;

determining the tension load imposed on the test specimen;

determining the elongation of the test specimen from said linear probes; and calibrating the instrument to be calibrated as a function of the determined values of load and elongation.

17. The method of claim 16 wherein:

the instrument to be calibrated is an ultrasonic extensometer, and the ultrasonic extensometer is coupled to the test specimen by an ultrasonic transducer.

* * * * *